United States Patent Office 3,354,186
Patented Nov. 21, 1967

3,354,186
16α-METHYL-1,4-PREGNADIENE-3,20-DIONES
Gerhard Raspé and Klaus Kieslich, Berlin-Charlottenburg, Erich Olivar, Berlin-Friedenau, Rudolf Müller, Berlin-Lankwitz, and Brigitte Wagner, Berlin-Halensee, Germany, assignors to Schering A.G., Berlin, Germany
No Drawing. Original application May 2, 1961, Ser. No. 107,029, now Patent No. 3,102,080, dated Aug. 27, 1963. Divided and this application Oct. 31, 1961, Ser. No. 148,810
Claims priority, application Germany, May 20, 1960, Sch 27,920
5 Claims. (Cl. 260—397.45)

This application is a division of our copending application Ser. No. 107,029, filed May 2, 1961, now Patent No. 3,102,080 entitled "Method of Producing 1,4-diene-3-ketosteroids."

The present invention relates to a method of producing 1,4-diene-3-ketosteroids, and more particularly to a new method which results in the production of such 1,4-diene-3-ketosteroids in high yield and also starting from compounds which could not previously be used as starting materials for the production of such final products, as well as to the production of new compounds.

The various perhydrocyclopentenophenanthrenes which simultaneously have double bonds in the 1-position and in the 4-position, for example prednisolone, prednisone, triamcinolone, $\Delta^{1,4}$-androstadiene-3,17-dione, and many others, possess valuable properties which make these compounds of great interest as therapeutic products and also as intermediate products for the production of therapeutic steroid products.

Methods of producing these compounds comprise not only chemical methods but also microbiological methods, the latter having the advantage also that they are applicable to compounds which are sensitive against chemical reagents, and in addition often gives rise to considerably improved yields. Not only bacteria but also fungi have been used for the introduction of a $\Delta^1$-double bond.

The species belonging to the family Bacillaceae have the common property of spore formation. With respect to the biochemical activity not only do the various species differ from each other, but also the strain of each species vary considerably, and in contrast to the fungi it is not possible by placing a bacteria in its place in the system to predict what its biochemical activity would be since often the origin of the individual strain of a species is of considerable importance with respect to its biochemical activity.

Thus, for example, a great number of hitherto available strains of Bacillus subtilis (Naturwissenschaften, 43, page 39) do not possess the property which they would be expected to possess according to the publication, namely of dehydrogenating a steroid hormone in 1,2- position.

In the case of the species Bacillus sphaericus, which has been used for a long time for the purpose of 1,2-dehydrogenation in the steroid series, it has been shown that besides very slow reaction speed that the success of the $\Delta^1$-introduction is greatly dependent on the structure of the used starting material. Thus, for example, only $\Delta^4$-3-ketosteroids can be converted to the corresponding $\Delta^1$-compound, but $\Delta^5$-3-hydroxy steroids cannot be so converted.

It is also known that microorganisms of the family Corynebacteriaceae the species Cornebacterium mediolanum and Corynebacterium simplex are useful for 1,2-dehydrogenation and also for the conversion of dehydroepiandrosterone into $\Delta^{1,4}$-androstadiene-3,17-dione. However, with these microorganisms only extremely moderate yields can be obtained and these require a long time because of the slow reaction speed.

The use of Fusarium solani or Streptomyces lavendulae is also disadvantageous for the conversion of dehydroepiandrosterone to $\Delta^{1,4}$-androstadiene-3,17-dione because in addition to the desired $\Delta^{1,4}$-androstadiene-3,17-dione also large amounts of testololactone and 1,2-dehydrotestololactone are formed.

It is accordingly a primary object of the present invention to provide for the production of $\Delta^{1,4}$- steroids in high yields and with improved reaction speed.

It is another object of the present invention to provide a microbiological method of producing $\Delta^{1,4}$-steroids which can start from various different starting compounds which could not be used as starting compounds prior to this method.

It is yet another object of the present invention to provide for the use of a new mutant of a microorganism which is particularly advantageous in the production of $\Delta^{1,4}$-steroids.

A still further object of the present invention provides for the method of producing such microorganism mutant for this purpose.

As yet another object the present invention provides for the production of new compounds which could not be produced prior to the method of the present invention. Other objects and advantages of the present invention will be apparent from a further reading of the specification and of the appended claims.

With the above and other objects in view, the present invention mainly comprises the discovery that a specially produced mutant of the Bacillus lentus has extremely good properties in the production of $\Delta^{1,4}$-steroids starting from various different starting compounds.

It has been discovered that it is possible to produce from per se inactive strains of the family Bacillaceae, preferably of the genus Bacillus, specially of the species Bacillus lentus by choice artificially produced mutants of the species which exhibit a remarkably improved biochemical activity.

It has thus been discovered that by ultra violet irradiation of a strain of the species Bacillus lentus which with respect to 1,2-dehydrogenase activity has at most only slight activity, which is isolated from a compost, to obtain by systematic selection a mutant (MB 284) which not only has the desired activity of dehydrogenation in the 1,2-position in singular manner, but in addition is capable of converting a 3-hydroxy-$\Delta^5$-group or a 3-acyloxy-$\Delta^5$-group into the 3-keto-$\Delta^{1,4}$-group. This obviously means a great extension of the groups of suitable starting materials for the production of $\Delta^{1,4}$-3-ketosteroids.

The starting compounds for the method of the present invention may be designated as any steroid the A ring of which has the following structure:

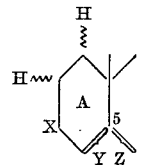

wherein either Y or Z designates a carbon-carbon double bond to the 5-carbon atom, and wherein X is selected from the group consisting of

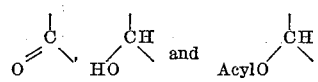

By treatment of such starting compound with Bacillus lentus MB 284 in accordance with the method of the present invention the resulting compound will be the corresponding steroid wherein the A ring has the following structure:

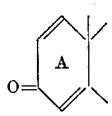

A culture of *Bacillus lentus* MB 284 was deposited at the American Type Culture Collection in Washington, D.C., under No. 13,805.

The surprising property of *Bacillus lentus* MB 284 does not correspond with any other known strain of the family Bacillaceae, and it also could not be predicted that by artificial mutation of a per se inactive strain that it would be possible to obtain a mutant with improved biochemical properties.

It has further been found that upon fermentation with the mutant MB 284 not only are surprisingly higher yields obtained, but also undesired conversion of the D-ring to a lactone ring does not occur and as a result the speed of the reaction is increased by about 5 times to about 7 times.

Within the above mentioned broadened group of suitable starting materials are included perhydrocyclopentenophenanthrene compounds which are saturated in the 1,2-position which contain at least one hydrogen atom on each of the carbon atoms in 1 and 2 position, preferably however containing 2 hydrogen atoms on each of the 1- and 2-carbon atoms, as well as compounds which contain on one of the two carbon atoms one hydrogen atom and on the other two hydrogen atoms, which compounds also contain an oxygen-function on the 3-carbon atom, preferably a keto group, a hydroxy group or an acyloxy group, most preferably a lower acyloxy group such as the acetyloxy group, in combination with a double bond between the 4 and 5 carbon atoms or between the 5 and 6 carbon atoms. It should be noted that these conditions do not exclude the possibility that at another portion of the steroid molecule there may be present other double bonds, and/or on the 10-carbon atom a methyl group, a free or functionally changed hydroxyl group or only a hydrogen atom, and that on still other carbon atoms such as the carbon atoms in the 6-, 9-, 11-, 16-, 17-, 20- or 21-position of the steroid framework there may be present the usual substituents such as keto groups, hydroxyl groups, methyl groups, epoxy groups, or halogens, particularly fluorine.

The further biochemical properties of the *Bacillus lentus* mutant MB 284 of the present invention are set forth in the following table in comparison to the species *Bacillus lentus* (according to Bergey's Manual of Determinative Bacteriology, 1957):

TABLE 1

| | Bacillus lentus | Bacillus lentus MB 284 |
|---|---|---|
| 5% glucose+0.5% potassium nitrate agar slant. | No growth | Very slight growth. |
| 1.5% soya bean meal agar slant. | Slight growth | Slight growth. |
| Nutrient bouillon | Good growth, uniform turbidity, granular sediment. | Good growth, uniform turbidity. |
| Milk agar ruled plate | Casein is not hydrolyzed. | Casein not hydrolyzed. |
| Milk | Unchanged | Unchanged. |
| Potato | No growth | Slight growth. |
| Starch ruled plate | Is hydrolyzed | No hydrolysis. |
| Acetylmethylcarbinol | Is not formed | Is not formed. |
| 0.5% sodium citrate, 0.5% ammonium nitrate. | No growth | No growth. |
| Nitrate reduction | Is not formed, no gas formation. | Is not formed, no gas formation. |
| High gelatin layer | No liquification | No liquification. |
| Gelatin plate | ___do___ | Do. |
| Sodium nutrient, 2–12%. | 4% good, 5% no growth. | 2–11% good, 12% slight growth. |
| Gas formation | None | None. |

TABLE 1—Continued

| | Bacillus lentus | Bacillus lentus MB 284 |
|---|---|---|
| Meat extract +0.5% ammonium chloride: | | |
| Ar | In the presence of ammonium salts. As nitrogen source. No acid formation occurs. | 0 |
| Xy | | + |
| Gl | | + |
| La | | 0 |
| Ma | | − |
| So | | + |
| Sc | | − |
| 1% meat extract+1% peptone: | | |
| Ar | + | 0 |
| Xy | + | 0 |
| Gl | + | + |
| La | | 0 |
| Ma | | 0 |
| So | | 0 |
| Sc | | + |

The following abbreviations are used in the table:

Ar.=Arabinose
Xy.=Xylose
Gl.=Glucose
La.=Lactose
Ma.=Mannose
So.=Sorbose
Sc.=Saccharose
+=Acid formation
O=No acid formation
−=Slight acid formation The following examples are given to further illustrate the present invention. The scope of the examples are not, however, meant to be limited to the specific details of the examples.

EXAMPLES

General method

A 50-liter capacity stainless steel fermenter is charged with 30 liters of the nutrient solutions mentioned in the following table; the nutrient solution is sterilized by heating for one half hour at 120° C., and after cooling inoculated with a bacteria suspension which is obtained by rinsing a bouillon agar surface of 64 cm.$^2$ with 7 cc. of physiological saline solution.

After 2 days of culturing at 25° C. under stirring (220 revolutions per minute) and airing (1650 liters per hour) 1.8 liters or the resulting culture are removed under sterile conditions and transferred into a fermenter with 28.2 liters of the same medium. At the same time there is added a solution of 7.5 g. of the steroid mentioned in the table in 200 cc. of ethanol and fermented under the same conditions. The fermentation times depending upon the particular steroid are also set forth in the table, and it will be seen that these times vary.

The course of the fermentation is followed by removing samples which are extracted with methylisobutyl-ketone. The extracts are analyzed by paper chromatography, preferably using a system of dioxane+toluene/propylene glycol and heptane/propylene glycol.

At the end of the fermentation time the culture broth is extracted three times, each time with 10 liters of methylisobutyl ketone. The purified extracts are concentrated in a circulating evaporator under vacuum and then under vacuum in a nitrogen atmosphere evaporated to dryness. The residue is subjected to chromatography on silica gel (10% addition of water). The utilized eluation agent as well as the solvent for the recrystallization of the isolated substance are set forth in the table which follows.

The nutrient solution "Md. 7" has the following composition:

1% yeast extract, 5% maize steep liquor and 2% glucose at a pH of 7.

The nutrient solution "Md. 36" is of the following composition:

15% peptone, 6% maize steep liquor and 3% glucose at a pH of 7.

The individual examples are summarized in the following table:

acetate having a melting point of 204–205° C. (ethanol); $\epsilon_{238}=15020$;

16α-methyl - 1,4 - pregnadiene-17α-ol-3,11,20-trione-17α-acetate having a melting point of 225.5–226° C. (chloroform/isopropyl ether); $\epsilon_{239}=14730$;

16α-methyl-1,4-pregnadiene-21-ol - 3,11,20 - trione - 21-acetate having a melting point of 209–210° C. (ethanol); $\epsilon_{237}=14820$.

TABLE 2

| Example | Substrate | Reaction product | Medium | Culture time in hours | Fermentation time in hours |
|---|---|---|---|---|---|
| 1 | 4-pregnene-11β,17α,21-triol-3,20-dione | 1,4-pregnadiene-11β,17α,21-triol-3,20-dione | Med. 7 | 48 | 16 |
| 2 | 4-pregnene-17α,21-diol-3,11,20-trione | 1,4-pregnadiene-17α,21-diol-3,11,20-trione | Med. 7 | 48 | 24 |
| 3 | 4-pregnene-17α,21-diol-3,20-dione | 1,4-pregnadiene-17α,21-diol-3,20-dione | Med. 7 | 48 | 12 |
| 4 | 4-pregnene-14α,17α,21-triol-3,20-dione | 1,4-pregnadiene-14α,17α,21-triol-3,20-dione | Med. 7 | 48 | 12 |
| 5 | 4-pregnene-12β,17α,21-triol-3,20-dione | 1,4-pregnadiene-12β,17α,21-triol-3,20-dione | Med. 7 | 48 | 20 |
| 6 | 4-pregnene-6β,17α,21-triol-3,20-dione | 1,4-pregnadiene-6β,17α,21-triol-3,20-dione | Med. 7 | 48 | 18 |
| 7 | 5-androstene-3β-ol-17-one | 1,4-androstadiene-3,17-dione | Med. 7 | 48 | 24 |
| 8 | 4-androstene-3,17-dione | 4-androstadiene-3,17-dione | Med. 7 | 48 | 16 |
| 9 | 9α-fluoro-4-pregnene-11β,17α,21-triol-3,20-dione | 9α-fluoro-1,4-pregnadiene-11β,17α,21-triol-3,20-dione | Med. 7 | 48 | 16 |
| 10 | 17α-methyl-4-androstene-17β-ol-3-one | 17α-methyl-1,4-androstadiene-3-one | Med. 7=1% Tween | 48 | 16 |
| 11 | 16α-methyl-4-pregnene-3,20-dione | 16α-methyl-1,4-pregnadiene-3,20-dione | Med. 7+1% Tween | 48 | 16 |
| 12 | 16,17α-oxydo-5-pregnene-3,21-diol-20-one-21-acetate | 16,17α-oxydo-1,4-pregnadiene-21-ol-3,20-dione | Med. 7 | 48 | 13 |
| 13 | 16α-methyl-4-pregnene-17α,21-diol-3,20-dione | 16α-methyl-1,4-pregnadiene-17α-21-diol-3,20-dione | Med. 36 | 48 | 20 |
| 14 | 16α-methyl-4-pregnene-11β,17α,21-triol-3,20-dione | 16α-methyl-1,4-pregnadiene-11,17α,21-triol-3,20-dione | Med. 7 | 48 | 16 |
| 15 | 16α-methyl-9α-fluoro-4-pregnene-11,17α,21-triol-3,20-dione | 16α-methyl-9-fluoro-1,4-pregnadiene-11β,17α-21-triol-3,20-dione | Med. 7 | 48 | 24 |
| 16 | 5-androstene-3β-ol-17-one | 1,4-androstadiene-3,17-dione | Med. 7 | 48 | 26 |
| 17 | Testololactone | Δ¹-dehydro-testololactone | Med. 7 | 48 | 24 |
| 18 | 16α-methyl-4-pregnene-11β,17α-diol-3,20-dione | 16α-methyl-1,4-pregnadiene-11β-17α-diol-3,20-dione | Med. 7 | 48 | 21 |
| 19 | 16α-methyl-4-pregnene-11β,21-diol-3,20-dione | 16α-methyl-1,4-pregnadiene-11β,21-diol-3,20-dione | Med. 7 | 48 | 18 |
| 20 | 16α-methyl-4-pregnene-17α-ol-3,11,20-trione (M.P.211.5-212.5° C., $\epsilon_{238}=14740$) | 16α-methyl-1,4-pregnadiene-17α-ol-3,11,20-trione | Med. 7 | 48 | 22 |
| 21 | 16α-methyl-4-pregnene-21-ol-3,11,20-trione+(M.P.179-181° C., $\epsilon_{237}=15120$) | 16α-methyl-1,4-pregnadiene-21-ol-3,11,20-trione | Med. 7 | 48 | 20 |
| 22 | 16α-methyl-4-pregnene-17α-21-diol-3,11,20-trione | 16α-methyl-1,4-pregnadiene-17α-21-diol-3,11,20-trione | Med. 7 | 48 | 22 |

TABLE 2A

| Ex. | Analytically determined yield | Eluation agent | Solvent | M.P. | αD | U.V. Absorption |
|---|---|---|---|---|---|---|
| 1 | 90% | Ethyl acetate | Methanol | 235–237° C | +100° dioxane | $\epsilon_{243}=15,000$ |
| 2 | 65% | Chloroform: ethyl acetate (1/2) | Acetone/water | 224–225° C | +170° dioxane | $\epsilon_{239}=15,000$ |
| 3 | 30% | Unreacted starting material is separated by Girard compound | Acetone | 238/240–242° C | 80.3 dioxane | $\epsilon_{242}=15,440$ |
| 4 | 60% | Ethyl acetate | Ethyl acetate isopropyl ether | 229–230° C | | $\epsilon_{244}=15,650$ |
| 5 | 35% | Not chromatographed | Ethyl acetate | 238/232–234° C | | $\epsilon_{242}=15,760$ |
| 6 | 45% | do | Ethyl acetate/ether | 227/229–231° C | | $\epsilon_{244}=15,100$ |
| 7 | 80% | Carbon tetrachloride: Methylene chloride: (1:2) | Hexane | 140–142° C | +111° chloroform | $\epsilon_{239}=12,100$ |
| 8 | 85% | do | do | 143–144.5° C | +115° chloroform | $\epsilon_{239.5}=12,300$ |
| 9 | 80% | Ethyl acetate | Ethyl acetate/isopropyl ether | 265–269° C | +109° chloroform | $\epsilon_{239}=14,800$ |
| 10 | 41%, 20% starting material | Methylene chloride/ethyl acetate (1:1) | Isopropyl ether | 160/162–163° C | 0° | $\epsilon_{243}=15,500$ |
| 11 | 57% | Carbon tetrachloride/methylene chloride | Hexane | 115/116–117° C | | $\epsilon_{244}=15,630$ |
| 12 | 50% (30% Δ⁴ compound) | Separation of Δ⁴ compound by Girard compound | Aqueous methanol | 204/206–208° C | +88° dioxane | $\epsilon_{241}=17,420$ |
| 14 | 93% | Ethyl acetate | Methyl isobutyl ketone | 219–220° C | | $\epsilon_{244}=15,150$ |
| 15 | 81% | do | Ethyl acetate | 221–223° C | | $\epsilon_{243}=14,700$ |
| 16 | 83% | Carbon tetrachloride/methylene chloride | Hexane | 140–142° C | +112° chloroform | $\epsilon_{239}=12,500$ |
| 17 | 62% | Chloroform | do | 207.5–208° C. chloroform | −44.9° | $\epsilon_{242}=16,100$ |
| 18 | 48% | CHCl₃ | Acetone | 211.5/212.5–213° C | | $\epsilon_{243}=15,540$ |
| 19 | 79% | Not chromatographed | Acetone/isopropyl ether | 191/192–193.5° C | | $\epsilon_{242}=15,100$ |
| 20 | 37% | CH₂Cl₂ | Methanol | 217.5/219–220° C | | $\epsilon_{238}=15,100$ |
| 21 | 45% | CHCl₃: ethyl acetate (4:1) | Ethyl acetate/hexane | 176/179–181° Q | | $\epsilon_{237}=15,120$ |
| 22 | 82% | Not chromatographed | Ethyl acetate | 199–202° C | | $\epsilon_{239}=15,200$ |

The starting compound or substrate of Example 20, i.e., 16α-methyl-4-pregnene-17α-ol-3,11,20-trione, is produced from the corresponding 11β-hydroxylated compound by oxidation with N-bromoacetamide in per se known manner.

The reaction products of Examples 19, 20 and 21 were acetylated in per se known manner to produce the following compounds:

16α-methyl-1,4-pregnadiene-11β,21-diol - 3,20 - dione-21-

The compounds of Examples 1, 2, 9, 13, 14, 15, 18, 19, 20, 21 and 22 possess corticoid activity, particularly an anti-inflammation action. The compound of Example 10 is anabolic. The compound of Example 17 is anti-androgenic, and the compounds of Examples 3, 4, 5, 6, 7, 8, 11, 12, 16 and 17 are suitable intermediate products for the synthesis of valuable steroids. These steroids can for example be produced by hydrogenating the 4,5-double bond, by acetylation of one or more hydroxyl groups, etc.

The fermentation temperature may in general vary between about 20 and 30° C., and is most preferably maintained at 25° C. The preferred concentration range is between 100 and 200 mg./l., and is most preferably about 250 mg. per liter.

Although the above set forth fermentations were all carried out with cultures, as indicated previously, the reaction may be carried out by the use of enzymes which can be obtained in per se known manner by mechanically destroying the cells or by destroying them by means of ultrasonics and subsequently fractionally precipitating (for example by means of ammonium sulfate, protamine sulfate, etc.) or by fractional absorption (for example, with calcium phosphate gel). This is preferably carried out at temperatures between 0 and 10° C.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. $16\alpha$-methyl-1,4-pregnadiene - $11\beta,17\alpha$ - diol - 3,20-dione.
2. $16\alpha$-methyl-1,4-pregnadiene-$11\beta,21$-diol-3,20-dione.
3. $16\alpha$-methyl-1,4-pregnadiene-$17\alpha$-ol-3,11,20-trione.
4. $16\alpha$-methyl - 1,4-pregnadiene-$17\alpha$-ol-3,11,20-trione-$17\alpha$-acetate.
5. $16\alpha$-methyl-1,4,-pregnadiene - $11\beta,21$ - diol - 3,20-dione-21-acetate.

References Cited

UNITED STATES PATENTS

| 2,887,499 | 5/1959 | Carvajal | 260—397.45 |
| 3,023,206 | 2/1962 | Burn et al. | 260—239.55 |
| 3,161,663 | 12/1964 | Joly et al. | 260—397.45 |

FOREIGN PATENTS

| 850,368 | 10/1960 | Great Britain. |
| 329,570 | 6/1958 | Switzerland. |

OTHER REFERENCES

Oliveto, J.A.C.S., vol. 80 (1958) p. 4428 relied on.

ELBERT L. ROBERTS, *Primary Examiner.*

M. LIEBMAN, IRVING MARCUS, LEWIS GOTTS, *Examiners.*